June 24, 1930.                S. M. SCOTT                1,766,551
                              BAKER'S PEEL
                          Filed Nov. 22, 1928
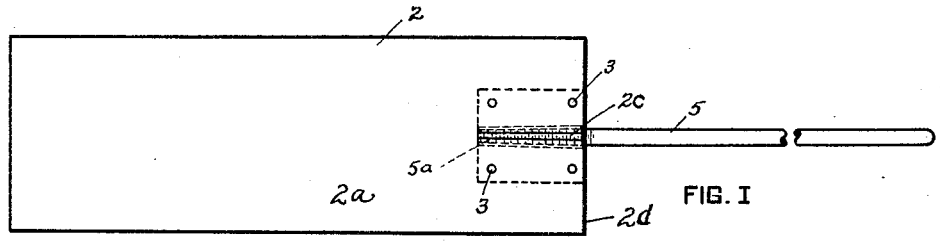
FIG. I
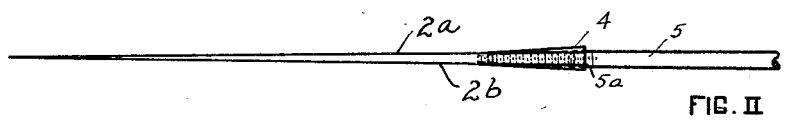
FIG. II
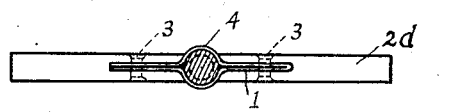
FIG. III
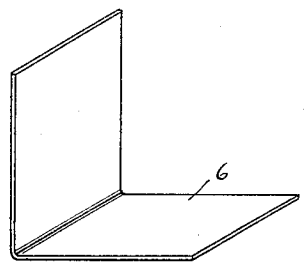
FIG. IV
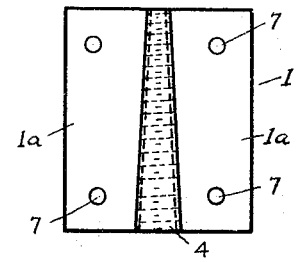
FIG. V
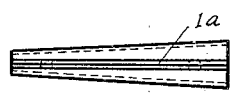
FIG. VI
INVENTOR
Samuel M. Scott
by William B. Wharton
his attorney Patented June 24, 1930

1,766,551

UNITED STATES PATENT OFFICE

SAMUEL M. SCOTT, OF WEST VIEW, PENNSYLVANIA

BAKER'S PEEL

Application filed November 22, 1928. Serial No. 321,095.

This invention relates to a baker's peel, and more particularly to the means for fastening a handle into a, so called, peel blade.

In the art, it is well known that peels are employed to move the pans of bread into and out of the baking ovens. The ordinary peel consists of a flat wooden blade portion upon which the pans of bread are placed to move them. To this blade portion a long handle is removably attached, and it is important that the handles may be easily attached to and removed from the peel blade. The peel blades are constructed to be slid into appropriate slots in a baker's proofing cabinet, and serve as shelves therein. Obviously, one handle may serve for any number of peel blades, and obviously, it is desirable to provide means whereby the said handle may be quickly attached to and removed from said blades. Most peels now in use are provided with slotted openings or fixtures into which a peel handle may be fixed by means of a through pin or bolt.

The object of this invention is to provide means whereby a peel handle may be affixed to a peel blade without the necessity of passing a bolt through the handle.

A further object of the invention is to provide a fixture for peel blades, which may readily be pressed out of sheet metal, and permanently fixed in a peel blade removably to retain a peel handle.

In the accompanying drawings Figure I is a plan view of a peel blade, showing in dotted lines the device of the present invention mounted therein; Figure II is a side elevation of the same; Figure III is an end view of the peel showing the handle mounted therein, in cross section; Figure IV is an isometric view of a piece of sheet metal from which the handle retaining device may be stamped; Figure V is an enlarged plan view of the formed device; and Figure VI is a side elevation of the same.

The essence of the invention resides in the member 1, shown in plan view in Fig. V, which is inserted in an appropriate slot in the peel blade 2, and fixed therein by means of the countersunk rivets 3. The member 1 is provided with a conical portion 4, which is threaded or formed with threads, said threads having a large rounded section suitable to engage threads of the type usually cut on wooden handles, and the like. The peel handle 5 has a tapered end $5^a$, which is threaded to engage internally the said portion 4 of the member 1.

It is important to note that, by having the portion 4 tapered or conical, the threaded end $5^a$ of the handle may be passed into said portion, and one or two turns of the handle will give a complete engagement with the threads throughout the bore of the said portion 4. Obviously, this is of great importance, in that it saves the operator a great deal of time in attaching and removing the handle. The portion 4 need not be threaded throughout its length. That is, the bore of portion 4 may be provided with threads for only an eighth, more or less, of its length. Such short threaded region may serve to engage securely the threaded handles, equally as well as the continuously threaded bore, as shown.

Although it may be possible to form the member 1 in an integral casting, it is cheaper and preferable to form the same of sheet metal. A piece of sheet metal 6 may be bent over a suitable threaded die stem, and pressure dies brought together over the same to punch the rivet holes 7 and form the member 1, as illustrated. The flat fin portions $1^a$, which are formed by the over-lapping of the bent sheet 6, serve as excellent means with which to support and fasten the member in the appropriate slot of the peel blade 2.

It is important to note that the device of the present invention does not interfere with the two large surfaces $2^a$ and $2^b$ of the peel blade. That is, the peel blade may be rectangular in shape, and the whole of either surface $2^a$ or $2^b$ of the same may be used to retain the pans of bread. If the peel blade is relatively thin, it may be necessary to slot the same at $2^c$ to permit the portion 4 of the member 1 to protrude slightly, as shown in Figs. I and II, but this protrusion does not prevent pans of bread from resting thereon. It will be noted that the member 1 is fitted not to project beyond the edge surface $2^d$, to permit the blade portion of the peel to be used as a shelf, as mentioned supra.

What I claim is:

1. In a baker's peel a blade portion, a member countersunk and fixed to lie substantially within the surfaces of said blade portion, said member having a conical threaded bore and thin side projections extending longitudinally with said bore to serve as fastening means to rigidly fix said member within said peel blade, and a handle threaded to seat in said conical bore.

2. In a baker's peel a blade portion, a handle receiving member countersunk and fixed to lie substantially within the surfaces of said blade portion, said member having a bore, side projections extending longitudinally of the bore, together with means passing through the said projections and into the peel blade to fix rigidly said handle-receiving member in said blade.

3. In a baker's peel a blade portion, a metal member having a bore in which to secure a peel handle, and an attaching projection on said metal member lying in a plane extending with said bore, said metal member being so countersunk in and fixed to the blade portion that said projection and said bore are substantially within the surfaces of said blade portion.

4. In a baker's peel a blade portion, and a handle-receiving member having a bore and side projections extending longitudinally of the bore, said member being so fixed to the blade portion that said bore as well as said side projections extend into the body of said blade portion.

In witness whereof, I hereunto set my hand.

SAMUEL M. SCOTT.